Patented Mar. 7, 1944

2,343,296

UNITED STATES PATENT OFFICE 2,343,296

RESINOUS CONDENSATION PRODUCT AND PROCESS OF MAKING IT

Herbert Hönel, Vienna, and Alois Zinke, Graz, Germany; vested in the Alien Property Custodian No Drawing. Application March 24, 1941, Serial No. 385,008. In Germany May 25, 1935

11 Claims. (Cl. 260—51)

The invention relates to condensation products formed by the reaction of high molecular terpene phenols with formaldehyde, which condensation products may be used for the preparation of varnishes.

The present application is a continuation in part of our application Serial No. 141,554, filed May 8, 1937, now Patent No. 2,242,250, dated May 20, 1941, which in turn is a division of our application Serial No. 30,152 filed July 6, 1935, now Patent No. 2,123,898 dated July 19, 1938. In the latter are claimed some of those terpene phenols which are employed for the preparation of the condensation products claimed in application Serial No. 141,554 and in the present application.

In our application Serial No. 141,554 is claimed a process which comprises condensing together in the presence of a condensing agent capable of eliminating hydrogen halide (1) a poly-halogenated terpene and (2) a phenol in the proportion of substantially more than one molar weight of the phenol to each molar weight of the poly-halogenated terpene whereby substitution of the halogen atoms by phenolic aromatic radicals takes place with elimination of hydrogen halide, continuing the condensing action at elevated temperature until a condensation product is obtained consisting essentially of the terpene and the phenol in chemical combination in substantially the aforesaid proportion and then condensing the said condensation product with an aldehyde. The present application relates to a process of producing resinous phenol formaldehyde condensation products, which comprises subjecting a terpene phenol condensation product which has at least one double bond and which is derived from a terpene and a phenol in the proportion of more than one molar weight of the terpene to each molar weight of the phenol, to a prolonged heat treatment in the presence of a metal halide of the Friedel-Crafts type and hydrogen halide until a solid resin is obtained and condensing the said resin with formaldehyde.

In carrying out the process of our invention we start from the following materials: (1) Terpenes which easily form poly-halogen compounds, preferably by addition of hydrogen chloride, (2) phenols such as common phenol or its easily available homologues, (3) formaldehyde or its polymers or homologues.

The term terpene will be used in the following description and claims for terpenes in the restricted sense of the term such as limonene, terpinolene, terpine, terpineol, carvone, etc.; sesquiterpenes such as cadinene; polyterpenes such as coniferyl alcohol; acylic compounds which readily derive from or may readily be converted into terpenes, such as the so called "terpenogenes" or "olefinic terpenes" e. g. isoprene, geraniol, linalool, terpinehydrate, citral; compounds of undefined constitution e. g. deriving from polyterpenes mainly by means of heat treatments or other simple chemical conversions; in many cases these substances constitute cheap waste products.

These compounds are characterised in that they readily form poly-halogen compounds. Unsaturated compounds in which a tertiary carbon atom is connected by a double linkage with another C atom (as illustrated by the grouping

are particularly suitable since they form tertiary halogen compounds (halides) by mere addition.

There are many easily available materials which at least contain a high percentage of such chemically strictly determined terpenes as mentioned above. We wish to mention dipentenes, conifer oils, pine oil, cuminoil (caraway seed oil), various decomposition (depolymerisation) products of rubber and natural resins such as rosin oil, copal oil.

According to our invention one or more members of the first group briefly referred to as terpenes are chemically combined with one or more members of the second group by producing halogen compounds, such as by addition or other interaction from suitable terpene compounds and hydrogen halides and causing these products to react with the members of the second group i. e. the phenols in the presence of aluminum chloride, zinc chloride, ferric chloride or other suitable metal halides or substances which form the same under the conditions of the reaction, such as zinc or iron dust.

For our preferred process we either first prepare the hydrogen halide addition or conversion products separately or in the presence of the phenol, or we form them intermediately by means of the hydrogen halides set free during the condensation. Hydrogen halide which has been set free by reacting the phenol with any other suitable organic halogen compound, such as a tertiary alkyl halide or benzyl chloride or the like, may also be used for this intermediate formation. In this case the aforesaid organic halogen compounds serve as additional auxiliary material for initiating the condensation between the phenol and the terpene-like compound.

The last mentioned method of forming hydrogen halide addition or conversion products in the presence of phenols, is limited to terpene-like compounds which in the course of the reaction of the hydrogen halide do not form water, such as would render the catalyst inactive or at least would have a very detrimental effect thereon.

For the sake of completeness we wish to mention that in some cases (which, as stated above, are restricted to non-alcoholic terpenes) the condensation reaction may be performed by means of aluminum chloride, or the like, alone. The hydrogen halide necessary for initiating the condensation reaction, is formed from the aluminum chloride since traces of water are generally present.

By employing relatively small quantities of the phenol particularly when condensing during a relatively short time and when employing small quantities of the catalyst as a rule soft or even only viscous terpene phenols are obtained. Unexpectedly we have found that even those soft condensation products can be converted into resinous solid products, obviously by virtue of their unsaturated character or their capability of forming a double linkage under the prevailing conditions. This conversion probably is caused by polymerisation; we effect it by heating the condensation product for a particularly long period, preferably in the presence of a comparatively large quantity of catalysts. As suitable catalysts there are to be regarded metal halides of the Friedel-Crafts type in conjunction with hydrogen halide which may be introduced into the reaction mixture or is formed during the condensation. Products may be obtained which have a by far increased molecular size and which, notwithstanding a relatively small proportion of combined phenol, indicate the presence of several phenolic benzene nuclei in the molecule. They behave very similarly to terpene-phenols which are obtained from polyvalent terpene halides and phenol in excess, and which themselves are to be regarded as polyvalent polynuclear phenolic compounds.

The hereinbefore described method of carrying out our process is particularly advantageous because in this way it is also possible to compound practically all the phenol. Otherwise uncombined phenol as a rule remains behind and must be removed by washing or by steam or vacuum distillation.

The terpene phenol compounds are then subjected to condensation with formaldehyde. Condensation products of particular technical value may be obtained showing the most various properties. These depend on the proportions, the catalyst, temperature and duration of the reaction and on other controllable conditions. The variability is far broader than otherwise known when condensing phenols with aldehydes.

In order to facilitate the mutual contact between the high molecular phenols and the aqueous formaldehyde, we prefer to employ as auxiliary materials indifferent solvents, such as saturated or aromatic hydrocarbons or alcohols, which may be removed after condensation has taken place. It is particularly advantageous to condense the high molecular phenols with formaldehyde in a manner known per se at ordinary or only moderately elevated temperatures for a prolonged period of time by means of a strong alkali and subsequent neutralization. By means of this process we obtain formaldehyde condensation products showing a considerable hardening character if condensing high molecular phenols obtained from common phenol although they have combined only a relatively small proportion of phenol. We have also concluded from the distinct hardening character peculiar to these formaledhyde condensation products, that the solid resinous phenolic body contains several hydroxylphenyl groups in the molecule i. e. that a polyphenylol-terpene compound is formed. In contradistinction thereto the still oily or soft interaction product primarily obtained from phenol and e. g. dipentene in the proportions mentioned above, even when condensed with formaldehyde according to our particular condensation process, leads to products having little or no hardening capacity. The maximum amount of formaldehyde which can be compounded is dependent on the quantity and on the constitution of the phenol employed for producing the high molecular terpene phenol. E. g. terpene phenols obtained from o-cresol or technical mixtures of cresols, xylenols etc. and dipentene exhibit only a very poor or no hardening capacity.

Condensation products deriving from the last mentioned phenols, also when obtained according to our particular condensation process, are easily compatible with all kinds of varnish raw materials such as resins and fatty oils of the drying or non-drying type. If however phenol is used as starting material the resulting terpene polyphenylol compound may form an oil incompatible heat hardening formaldehyde condensation product unless certain precautions are taken. We either reduce the proportion of formaldehyde below the maximum quantity which can be taken up, to a sufficient extent or we employ polyphenylol compounds in which the terpenic part is particularly large.

However it is also possible and in some cases advantageous to achieve oil compatibility only by a secondary treatment of an oil incompatible heat hardening condensation product. A preferred treatment consists of simply heating this condensation product which an alcohol for some time at elevated temperature until the desired compatibility is achieved. The presence of a slight amount of an acid accelerates such modification. Another way which secures sufficient oil compatibility consists in the coemployment of phenols such as p-tert.-butyl phenol, amyl phenol etc. which, when used alone, lead to completely oil soluble condensation products due to their reduced activity and long chain substituents.

It is remarkable that the formaldehyde condensation products of the oil reactive type derived from some of our polyphenylol compounds, despite the particularly large terpenic substituent, exhibit a greater hardening capacity than e. g. products of this type derived from ordinary alkyl phenols such as p-tert.-butyl phenol; this can be seen from the greater increase in viscosity of the oil-resin reaction mixture.

The new resins represent excellent basic materials for varnishes both of the air and stove drying type. Their employment in oil varnishes noticeably increases the resistance against water and weathering conditions. A particular advantage of these resins insofar as they belong to the oil reactive type, consists in that they do not disturb the drying capacity of the oil they are reacted with, in contradistinction to oil reactive resins obtained from alkyl phenols. Excellent results may also be obtained when combining or interacting resins prepared according to our invention with resins, particularly of the drying alkyd type.

The following examples may serve for illustration. We wish it to be understood positively that they are not restrictive as to the proportions etc. used.

Example 1

100 parts of phenol and 250 parts of technical dipentene of which a small part was first saturated separately or in the presence of the phenol, with hydrogen chloride, are condensed at 50–70° C. in the presence of 3 parts of zinc chloride.

If the reaction mixture is subjected after a few hours to steam distillation, about 250–255 gms. of a soft or viscous residue are obtained. If heating is continued for a further 48–72 hours, preferably at somewhat higher temperatures, and after increasing the catalyst, about 320 gms. of a residue remain after steam distillation in the form of a solid resin. About 15 gms. of inactive fractions of the technical dipentene and hardly any unused phenol pass over with the steam. The solid resinous condensation product has far higher molecular weight than the soft or viscous one primarily obtained. It is noticeable that far more than one mol. of the terpene per each mol. of phenol has been combined.

A heat hardening oil soluble resin e. g. is obtained when condensing this product which is considered to be a polyphenylol compound, with a large polyterpene substituent, with about 200 parts of formaldehyde (40% vol.). This step is performed by first diluting the resinous phenylol compound in a small proportion of an inert solvent such as toluene or xylene and adding caustic soda solution until a homogeneous reaction mixture is obtained. After several days the mixture is neutralized and the resin solution obtained thoroughly washed. After evaporating the solvent a resin is obtained which shows a very distinct hardening capacity. Its compatibility with neutral varnish materials including drying oils is surprising, for the phenolic body from which it derives at least mainly consists of a polyphenylol terpene having more than two unoccupied reaction favorable positions.

Example 2

If reducing the dipentene to about 170 parts per 100 parts of phenol and operating in the same way as in Example 1 a solid resinous phenolic compound is obtained in which approximately equimolecular quantities of phenol and dipentene are chemically combined the formaldehyde condensation product prepared in the same way and with the proportion as in Example 1, exhibits such an intense hardening capacity that no homogeneous interaction products can be obtained with neutral resins or oils.

It can be rendered oil soluble by heating it with about 100 parts of ordinary alcohol in the presence of a slight quantity of hydrochloric or phosphoric acid at about 60–80° C. for several hours.

It is very noticeable that the still viscous interaction product primarily obtained by only a short interaction of phenol and dipentene in the same proportions, does not lead by any means to formaldehyde condensation products of any pronounced hardening capacity.

We claim:

1. A process for producing resinous phenol formaldehyde condensation products, which comprises subjecting a soft terpene phenol condensation product which has at least one double linkage and which is derived from a terpene and a phenol in the proportion of more than one molar weight of the terpene to each molar weight of the phenol, to a prolonged heat treatment in the presence of a metal halide of the Friedel-Crafts type and hydrogen halide until a solid resin is obtained and then condensing the said resin with an aldehyde.

2. A process for producing resinous phenol formaldehyde condensation products, which comprises subjecting a soft terpene phenol condensation product which has at least one double linkage and which is derived from a terpene and a phenol in the proportion of more than one molar weight of the terpene to each molar weight of phenol, to a prolonged heat treatment in the presence of a metal halide of the Friedel-Crafts type and hydrogen halide until a solid resin is obtained and then condensing the said resin with formaldehyde.

3. A process according to claim 2, wherein the formaldehyde condensation product is heated with an alcohol until oil-compatibility is obtained.

4. A process according to claim 2, characterized in that the solid resinous terpene phenol condensation product and an alkyl phenol which alone leads to completely oil soluble heat hardening formaldehyde condensation products, are condensed with formaldehyde.

5. A process which comprises (1) preparing a soft terpene phenol condensation product which has at least one double linkage, by condensing together in the presence of a condensing agent capable of eliminating hydrogen halide, a terpene halide, and a phenol in the proportion of more than one molar weight of the halogen compound to each molar weight of the phenol, (2) continuing the condensing action by heating in the presence of the condensing agent and hydrogen halide until a phenolic resin of substantially higher molecular weight is obtained and (3) condensing the said phenolic resin with formaldehyde.

6. A process according to claim 5, in which the terpene halide is formed intermediately from a terpene having more than one double linkage by means of the hydrogen halide set free during the condensation, the reaction being initiated by adding a small portion of a reactive hydrocarbon halide.

7. A process according to claim 2, wherein the formaldehyde condensation product is heated with an alcohol in the presence of a slight quantity of an acid acting substance until oil-compatibility is obtained.

8. A process according to claim 2, in which formaldehyde in excess over the equimolecular proportion is employed and the condensation with formaldehyde is performed by the aid of a strong alkali catalyst at a temperature not substantially above ordinary temperature, for a prolonged period of time ranging up to several weeks and subsequently removing the said alkali catalyst.

9. A process which comprises condensing a halogen compound produced by interaction of dipentene and a hydrogen halide, and phenol in a proportion of more than one molar weight of the halogen compound to each molar weight of phenol in the presence of a condensing agent capable of eliminating hydrogen halide, continuing the condensing action by heating in the presence of the condensing agent and hydrogen halide until a phenolic resin of substantially higher molecular weight is obtained, condensing the said phenolic resin with formaldehyde in excess over the equimolecular proportion by the aid of a strong alkali catalyst at a temperature not substantially above ordinary temperature, for a prolonged period of time ranging up to several weeks and subsequently removing the said alkali catalyst and heating the product obtained with an alcohol in the presence of a slight quantity of an acid acting substance until oil compatibility is obtained.

10. A resinous product obtained according to claim 1.

11. A heat hardening resin obtained by condensing formaldehyde and a solid resinous terpene phenol which has been prepared by heating a soft unsaturated terpene phenol condensation product for a prolonged period of time ranging up to several days in the presence both of a metal halide capable of eliminating hydrogen halide, and hydrogen halide, the terpene phenol being derived from a terpene and a phenol in the proportion of more than one molar weight of the terpene to each molar weight of the phenol.

HERBERT HÖNEL.
ALOIS ZINKE.